(No Model.)

C. H. REED.
BICYCLE TIRE.

No. 564,339.  Patented July 21, 1896.

WITNESSES:
N. B. Harris
C. Gerz

INVENTOR
Carroll H. Reed,
BY
Agar Tate & Co
ATTORNEYS

UNITED STATES PATENT OFFICE.

CARROLL HERBERT REED, OF NEW YORK, N. Y.

BICYCLE-TIRE.

SPECIFICATION forming part of Letters Patent No. 564,339, dated July 21, 1896.

Application filed September 3, 1895. Serial No. 561,374. (No model.)

*To all whom it may concern:*

Be it known that I, CARROLL HERBERT REED, a citizen of the United States, and a resident of New York, in the county of New York and State of New York, have invented certain new and useful Improvements in Bicycle-Tires, of which the following is a specification, reference being had to the accompanying drawings, forming a part thereof, in which similar letters of reference indicate corresponding parts.

This invention relates to bicycle-wheels, and the object thereof is to provide improved tires therefor, a further object being to provide improved supports for the tires; and with this and other objects in view the invention consists in the construction, combination, and arrangement of parts hereinafter described and claimed.

The invention is fully disclosed in the following specification, of which the accompanying drawings form a part, in which—

Figure 1:
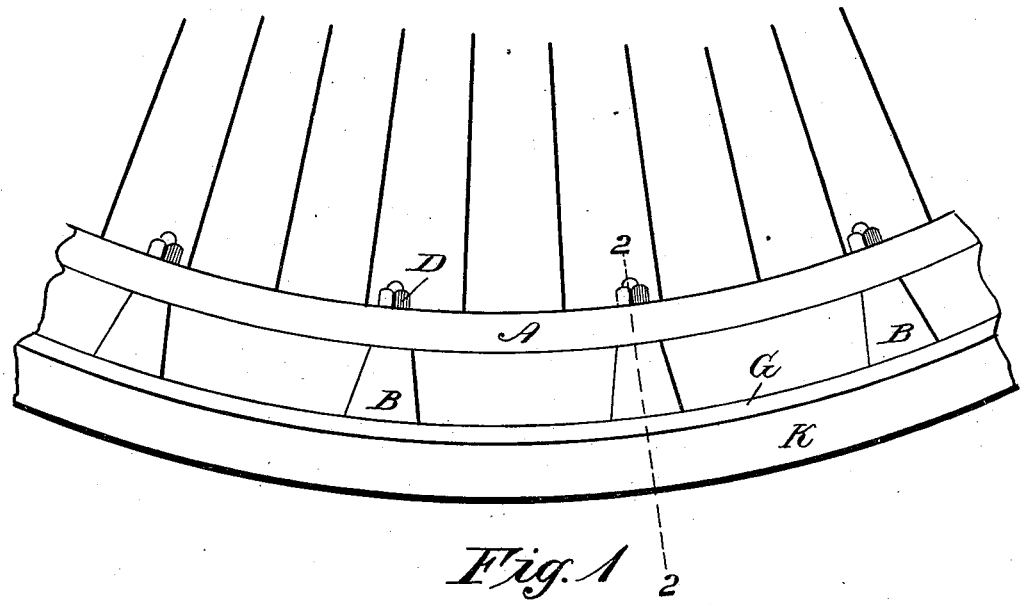
Figure 2:
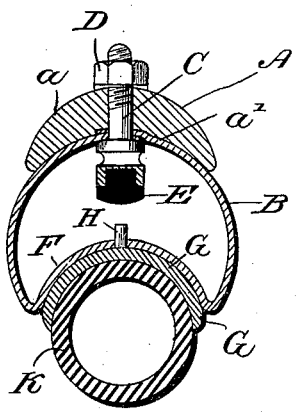

Figure 1 is a side elevation of a section of a bicycle-wheel provided with my improvement, and Fig. 2 a transverse section on the line 2 2 of Fig. 1.

In the practice of my invention I provide an ordinary rim A, which is convex on its inner surface, as shown at $a$, and concave in cross-section on its outer surface, as shown at $a'$, and secured thereto at regular and predetermined intervals are rings or bands B, of spring-brass or similar material, which are firmly secured to the rim A by means of bolts C, passed therethrough and through the rings or bands B, the inner ends of said bolts being provided with nuts or burs D, and the outer ends thereof being provided with rubber caps or heads E, which are secured thereto in any desired manner.

The outer portion of the rings or bands B are curved inwardly, as shown at F, so as to form segmental bearing-surfaces, in which are secured a supplemental tire G, which is segmental in cross-section and which may be composed of wood, metal, and any other preferred material. The tire G is provided with pins or projections H, which extend through the inwardly-curved portion F of the rings or bands B, as clearly shown in Fig. 1, and which, when the rings or bands B are depressed in the operation of the machine, will strike upon the rubber heads E of the bolts C and prevent injury to or the collapsing of said rings or bands.

Secured to the supplemental tire G, in any desired manner or in the usual manner, is a pneumatic tire K, which is preferably composed of rubber, as usual in this class of devices, and which is also preferably smaller in cross-section than the usual pneumatic tire.

My invention is not limited to the use of a pneumatic tire, as K, and I may substitute therefor a solid tire without departing from the spirit of my invention, and such a tire under certain circumstances would be of great advantage, the same being much more durable than the pneumatic tire, and with my improvement the spring action of the pneumatic tire is obtained through the use of the rings or bands B, as will be understood. When a pneumatic tire is employed, however, it will be seen that I provide an addition to the spring action thereof and supplemental spring-supports therefor, by means of which greater elasticity in the supports of the machine is produced, the spring rings or bands B contributing largely to this result.

Although I have shown and described my improvement as applied to bicycle-wheels, it is evident that the same may be applied to the wheels of other vehicles, such as carriages, buggies, light wagons, &c., and the invention is therefore not limited to the arrangement herein shown and described.

The outer portion of the bands or rings B need not necessarily be inwardly curved, as shown at $b$, and if not so curved the supplemental rim G must be made so as to conform thereto; and it is also evident that the tire K need not be cylindrical or circular in cross-section.

My invention is not, therefore, limited to the exact form, construction, and arrangement of parts shown and described, and I therefore reserve the right to make all such alterations as fairly come within the scope of the invention.

Having fully described my invention, I claim and desire to secure by Letters Patent—

1. The combination with a bicycle-wheel, of a rim as A, which is segmental in cross-section on its outer surface, spring rings or bands connected therewith transversely thereof by means of bolts, the outer ends of which are provided with rubber heads, and the outer portions of said spring rings or bands being inwardly curved or segmental, a supplemental rim mounted in said inwardly-curved portions and provided with pins or projections which extend therethrough and are adapted to be pressed in contact with the rubber heads on the bolts, and a pneumatic tire mounted in said supplemental rim, substantially as shown and described.

2. A wheel provided with a rim as A, spring-rings having a convex upper portion and a concave lower portion, said rings or bands being secured to said tire by means of balls, the heads of which are within the rings or bands and are provided with a rubber packing or buffer, a supplemental rim secured within said concave portion of the rings and the pneumatic tire secured in said supplemental rim, substantially as described.

3. A wheel provided with a rim as A, spring rings or bands connected therewith, transversely thereof and extending outwardly, said rings or bands being secured to said tire by means of bolts, the heads of which are within the rings or bands and are provided with a rubber packing or buffer, and a tire connected with said rings or bands, said tire being supported by a supplemental rim which is provided with inwardly-directed projections which extend through the outer portion of said rings or bands, and are adapted when said rings or bands are depressed to strike upon the rubber heads of the bolts, or the rubber packing or buffers connected therewith, substantially as shown and described.

In testimony that I claim the foregoing as my invention I have signed my name, in presence of the subscribing witnesses, this 24th day of August, 1895.

CARROLL HERBERT REED.

Witnesses:
 C. GERST,
 E. VAN DEURSEN.